US011595352B2

(12) United States Patent
Jamiyanaa et al.

(10) Patent No.: US 11,595,352 B2
(45) Date of Patent: Feb. 28, 2023

(54) PERFORMING TRANSPORT LAYER SECURITY (TLS) TERMINATION USING CATEGORIES OF WEB CATEGORIZATION

(71) Applicant: Microsoft Technology Licensing, LLC, Redmond, WA (US)

(72) Inventors: Suren Jamiyanaa, Pittsburgh, PA (US); Yair Tor, Sammamish, WA (US); Sudharsan Balakrishnan Sripadham, Menlo Park, CA (US); Daniel Manesku, San Francisco, CA (US); Andrey Terentyev, Pleasanton, CA (US); Murali Krishna Sangubhatla, Fremont, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 107 days.

(21) Appl. No.: 17/129,723

(22) Filed: Dec. 21, 2020

(65) Prior Publication Data

US 2022/0200955 A1  Jun. 23, 2022

(51) Int. Cl.
*H04L 9/40* (2022.01)
*G06F 9/455* (2018.01)

(52) U.S. Cl.
CPC .......... *H04L 63/0227* (2013.01); *G06F 9/455* (2013.01); *H04L 63/101* (2013.01); *H04L 63/166* (2013.01)

(58) Field of Classification Search
CPC . H04L 63/0227; H04L 63/101; H04L 63/166; G06F 9/455
See application file for complete search history.

(56) References Cited

U.S. PATENT DOCUMENTS

| 8,327,128 | B1* | 12/2012 | Prince .................. H04L 9/3268 713/153 |
| 8,615,800 | B2 | 12/2013 | Baddour et al. |
| 9,419,942 | B1 | 8/2016 | Buruganahalli et al. |
| 9,467,421 | B2 | 10/2016 | Xie |

(Continued)

FOREIGN PATENT DOCUMENTS

| EP | 2850770 B1 | 12/2019 |
| WO | 2019023160 A1 | 1/2019 |

OTHER PUBLICATIONS

Mitsuaki Akiyama, Takeshi Yagi and Mitsutaka Itoh "Searching structural neighborhood of malicious URLs to improve blacklisting", 2011 IEEE/IPSJ International Symposium on Applications and the Internet, p. 1-10. (Year: 2011).*

(Continued)

*Primary Examiner* — Catherine Thiaw
(74) *Attorney, Agent, or Firm* — Ray Quinney & Nebeker; Tiffany Healy (57) ABSTRACT

The devices and methods relate to web categorization of web requests. The devices and methods may perform a two-step classification of the web requests. The first classification may provide potential web categories for web request based on a fully qualified domain name (FQDN) of the web request. The first classification may be used to determine whether transport layer security (TLS) termination may be performed on the web request. The second classification may provide a web category for a uniform resource locator (URL) of the web request after performing the TLS termination. The web category may be used by a firewall in filtering web traffic for the web request.

20 Claims, 5 Drawing Sheets

(56) References Cited

U.S. PATENT DOCUMENTS

| | | | |
|---|---|---|---|
| 9,794,229 B2 | 10/2017 | Yu et al. | |
| 2007/0180510 A1 | 8/2007 | Long et al. | |
| 2011/0167474 A1 | 7/2011 | Sinha | |
| 2014/0298445 A1* | 10/2014 | Jiang | H04L 63/20 726/13 |
| 2016/0191521 A1 | 6/2016 | Feroz et al. | |
| 2016/0359807 A1 | 12/2016 | Buruganahalli et al. | |
| 2018/0159882 A1* | 6/2018 | Brill | H04L 63/0272 |
| 2018/0351970 A1* | 12/2018 | Majumder | H04L 63/061 |
| 2019/0268305 A1 | 8/2019 | Xu et al. | |
| 2021/0112060 A1* | 4/2021 | Billawala | H04L 63/101 |

OTHER PUBLICATIONS

Xavier de Carné de Carnavalet and Mohammad Mannan "Killed by Proxy: Analyzing Client-end TLS Interception Software", 2016, NDSS '16, Feb. 21-24, 2016, San Diego, CA, USA, 17 pages (Year: 2016).*

"HTTPS Inspection", Retrieved From: https://sc1.checkpoint.com/documents/R81/WebAdminGuides/EN/CP_R81_SecurityManagement_AdminGuide/Topics-SECMG/HTTPS-Inspection.htm, Retrieved Date: Nov. 12, 2020, 8 Pages.

"URL Filtering Implementation and Troubleshooting", Retrieved From: https://knowledgebase.paloaltonetworks.com/KCSArticleDetail?id=kA10g000000CIRZCA0, Sep. 25, 2018, 4 Pages.

"User Guide for AsyncOS 11.0 for Cisco Web Security Appliances", Retrieved From: https://www.cisco.eom/c/en/US/td/iocs/security/wsa/wsa11-0/user_guide/b_WSA_UserGuide/b_WSA_UserGuide_chapter_01100.html, Aug. 24, 2018, 79 Pages.

"International Search Report and Written Opinion Issued in PCT Application No. PCT/US2021/058375", dated Feb. 9, 2022, 12 Pages.

* cited by examiner

PERFORMING TRANSPORT LAYER SECURITY (TLS) TERMINATION USING CATEGORIES OF WEB CATEGORIZATION

BACKGROUND

Users can allow or block web traffic through a firewall, by providing specific uniform resource locator (URL)s of websites to allow or block and/or providing internet protocol (IP) address to allow or block. In addition, firewall products may perform web categorization or filtering for customers who want to allow, or block web traffic based on categories (e.g., social media, search engines, gambling, etc.). The firewall products look at a first pass of web traffic in determining whether to allow to block the web traffic based on the information provided by the users. For example, the firewall products may only look at the fully qualified domain name (FQDN) of the web traffic in making a decision to allow or block the web traffic. The firewall products may erroneously block or allow traffic using only the FQDN for the categorization or filtering.

In addition, the firewalls make a decision whether to perform transport layer security (TLS) termination (decryption) on traffic to meet compliance and privacy needs. For example, to avoid decryption of financial of health content. However, to determine the nature of the content, the firewalls need to have visibility to its full URL which is only available after terminating TLS.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One example implementation relates to a method performed by a firewall. The method may include receiving one or more potential web categories for a web request based on a fully qualified domain name (FQDN) for the web request without receiving a full uniform resource locator (URL) for the web request. The method may include determining whether transport layer security (TLS) termination is enabled for the web request. The method may include comparing, in response to the TLS termination being enabled, the one or more potential web categories to a list of restricted termination categories. The method may include comparing the one or more potential web categories to filtering rule categories defined by at least one filtering rule. The method may include performing the TLS termination on the web request in response to the one or more potential web categories not matching any category of the list of restricted termination categories and a match occurring between the one or more potential web categories and any filtering rule categories. The method may include skipping the TLS termination on the web request in response to a match occurring between the one or more potential web categories and any category of the list of restricted termination categories or a match not occurring between the one or more potential web categories and any filtering rule categories.

Another example implementation relates to a firewall. The firewall may include one or more processors; memory in electronic communication with the one or more processors; instructions stored in the memory, the instructions being executable by the one or more processors to: receive one or more potential web categories for a web request based on a fully qualified domain name (FQDN) for the web request without receiving a full uniform resource locator (URL) for the web request; determine whether transport layer security (TLS) termination is enabled for the web request; compare, in response to the TLS termination being enabled, the one or more potential web categories to a list of restricted termination categories; compare the one or more potential web categories to filtering rule categories defined by at least one filtering rule; perform the TLS termination on the web request in response to the one or more potential web categories not matching any category of the list of restricted termination categories and a match occurring between the one or more potential web categories and any filtering rule categories; and skip the TLS termination on the web request in response to a match occurring between the one or more potential web categories and any category of the list of restricted termination categories or a match not occurring between the one or more potential web categories and any filtering rule categories.

Another example implementation relates to a device. The device may include one or more processors; memory in electronic communication with the one or more processors; instructions stored in the memory, the instructions being executable by the one or more processors to: receive one or more potential web categories for a web request based on a fully qualified domain name (FQDN) for the web request without receiving a full uniform resource locator (URL) for the web request; determine whether transport layer security (TLS) termination is enabled for the web request; compare, in response to the TLS termination being enabled, the one or more potential web categories to a list of restricted termination categories; compare the one or more potential web categories to filtering rule categories defined by at least one filtering rule; perform the TLS termination on the web request in response to the one or more potential web categories not matching any category of the list of restricted termination categories and a match occurring between the one or more potential web categories and any filtering rule categories; and skip the TLS termination on the web request in response to a match occurring between the one or more potential web categories and any category of the list of restricted termination categories or a match not occurring between the one or more potential web categories and any filtering rule categories.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims, or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to web categorization. Users can allow or block web traffic through a firewall, by providing specific uniform resource locator (URL)s of websites to allow or block and/or providing internet protocol (IP) address to allow or block. In addition, the firewall may perform web categorization or filtering for customers who want to allow, or block, web traffic based on categories (e.g., social media, search engines, gambling, etc.).

The firewall may filter web traffic of the web requests using filtering decisions and the firewall may allow or block the web traffic based on the filtering decisions. The firewall looks at a first pass of web traffic in determining whether to allow or block the web traffic based on the information provided by the users. For example, the firewall may only look at the FQDN of the web traffic in making a decision to allow or block the web traffic based on the information provided by the users. Another example may include the firewall terminating transport layer security (TLS) in making a decision to allow or block the web traffic.

One example use case may include a user trying to access google.com/news, in which the firewall is pre-configured to block "search engines" category of web sites but allow "news" category of websites. In this example, the FQDN is google.com, which is associated with a "search engine" category, and the full URL is google.com/news, which is associated with a "news" category. The firewall may determine that the FQDN of google.com is related to the category "search engine" and proceed to block the traffic. As a result, this may cause the firewall to erroneously block or allow traffic based on the "first pass" or FQDN only, and a user who wanted to actually reach google.com/news (allowed) will be blocked by the firewall.

Web traffic may be encrypted over a transport layer security (TLS) session. Web traffic that is encrypted may be decrypted using transport layer security (TLS) termination to provide visibility into the web traffic and understand what is being transmitted. TLS termination is a process by which encrypted traffic is decrypted according to the TLS protocol specification. As a result, TLS termination allows a firewall to decrypt the encrypted traffic and see the full URL. However, the supporting information for determining whether web traffic may be decrypted using TLS termination is inside the encrypted web traffic.

For example, a proxy, such as, a firewall, may intercept the web traffic, perform TLS termination on the web traffic to decrypt the web traffic, and make a decision to allow or block the web traffic using one or more filtering rules. With TLS termination, the firewall can decrypt the packet for the web traffic and see the full URL. By performing TLS termination and having the full URL available, the firewall may have more information to use in deciding whether to allow or block the web traffic. The full URL may provide additional information for use by the firewall than just the FQDN.

However, certain web traffic that is encrypted should not be decrypted using TLS termination for different reasons, such as, but not limited to, privacy reasons and/or compliance policies. For example, employee health data transmitted through web traffic over a corporate network should not be decrypted using TLS termination for privacy reasons. Other examples of web traffic that is should not be decrypted using TLS termination may include, but are not limited to, finance, government, and/or education web traffic. Thus, in the context of web categorization, a problem occurs in a firewall determining whether web traffic may be decrypted using TLS termination when some of the information supporting the decision to use TLS termination is encrypted and unavailable to the firewall.

The present disclosure provides web categories that allows users to select which web traffic to allow through a firewall or deny, by selecting different categories to allow or block. For example, a user may deny all social media networking websites from the user's firewall. Another example may include the user allowing all sports network websites through the user's firewall.

The present disclosure may improve the web categorization of web requests by performing a two-step process of classification of the web requests. The first classification provides possible web categories for the web requests using the FQDN of the web requests. The first classification may be used to determine whether TLS termination may be performed on the web requests. The possible web categories for the web requests may be compared to one or more rule categories of the filtering rules used by the firewall to allow or block traffic to determine if a match occurs between any of the possible web categories and any of the one or more rule categories. The present disclosure provides methods and systems for performing TLS termination on any category based on the FQDN unless the category is explicitly defined as a category not allowing TLS termination. The second classification provides a web category for the full URL after performing TLS termination on the web requests. The present disclosure may be used to improve security by only performing TLS termination on categories of web requests that may not violate privacy policies or other user configured policies for when TLS termination may not occur. As such, the present disclosure includes several practical applications that provide benefits and/or solve problems associated with web categorization and TLS termination.

The present disclosure improves the classification of web traffic by returning a plurality of potential categories for the web traffic. With the first pass of the FQDN, the firewall receives either a single category or multiple categories from a categorization agent for the web traffic. If one category of the plurality of potential categories is a target category in a rule for filtering the web traffic (e.g., a match occurs between any of the potential categories and any of the target categories of the filtering rules) and none of the returned potential categories is a category included in a list of categories that should not be terminated, then the present disclosure performs TLS termination on the web request and inspects the packet. Additionally, the present disclosure enhances the logic for rules with no category, but with a target URL. If the FQDN in the request matches the FQDN in the target URL, the present disclosure will perform the TLS termination unless the FQDN belongs to a never terminate category.

As such, to ensure that the firewall does not erroneously allow or deny a potential full URL, the present disclosure checks if a match occurs with any of the multiple categories presented in the first pass. The classification may return multiple categories and the access rules may include multiple categories. If any of the returned categories from the classification match any rule category of the access rules and any of the returned categories are not included in the do not terminate list, the firewall conducts full TLS termination. As such, the decryption using TLS termination occurs on a second pass of the rule processing for the firewall after looking at the first pass of FQDNs by the secure gateway. In other words, the firewall will perform TLS termination if one of the multiple categories are matched based on the FQDN and the category is not hard-coded in as categories to bypass for TLS termination.

The firewall is only able to pass a FQDN first to the categorization agent before having access the full URL. However, the full URL may have a different category than the FQDN. Thus, the firewall may erroneously block or allow traffic based on the categorization or filtering of the FQDN.

The present disclosure ensures that the firewall does not erroneously block traffic due a two-pass traffic inspection, and the logic to evaluate multiple categories in determining whether or not to proceed with opening the packet. In addition, the present disclosure prevents TLS termination from occurring on categories that are a top-of-mind security concern for TLS termination by including a "hard-coded" pass to not perform TLS termination on specific categories (e.g., banking, government, education).

Thus, the present disclosure provides a two-step process that improves the accuracy of performing full TLS termination and enhances security by allowing web traffic and blocking web traffic when needed. In addition, the present disclosure guarantees to block specific categories from opening full packets using TLS termination, for example, when there are privacy issues or other compliance issues. As such, the present disclosure provides improved accuracy and security of web categorization.

Figure 1:
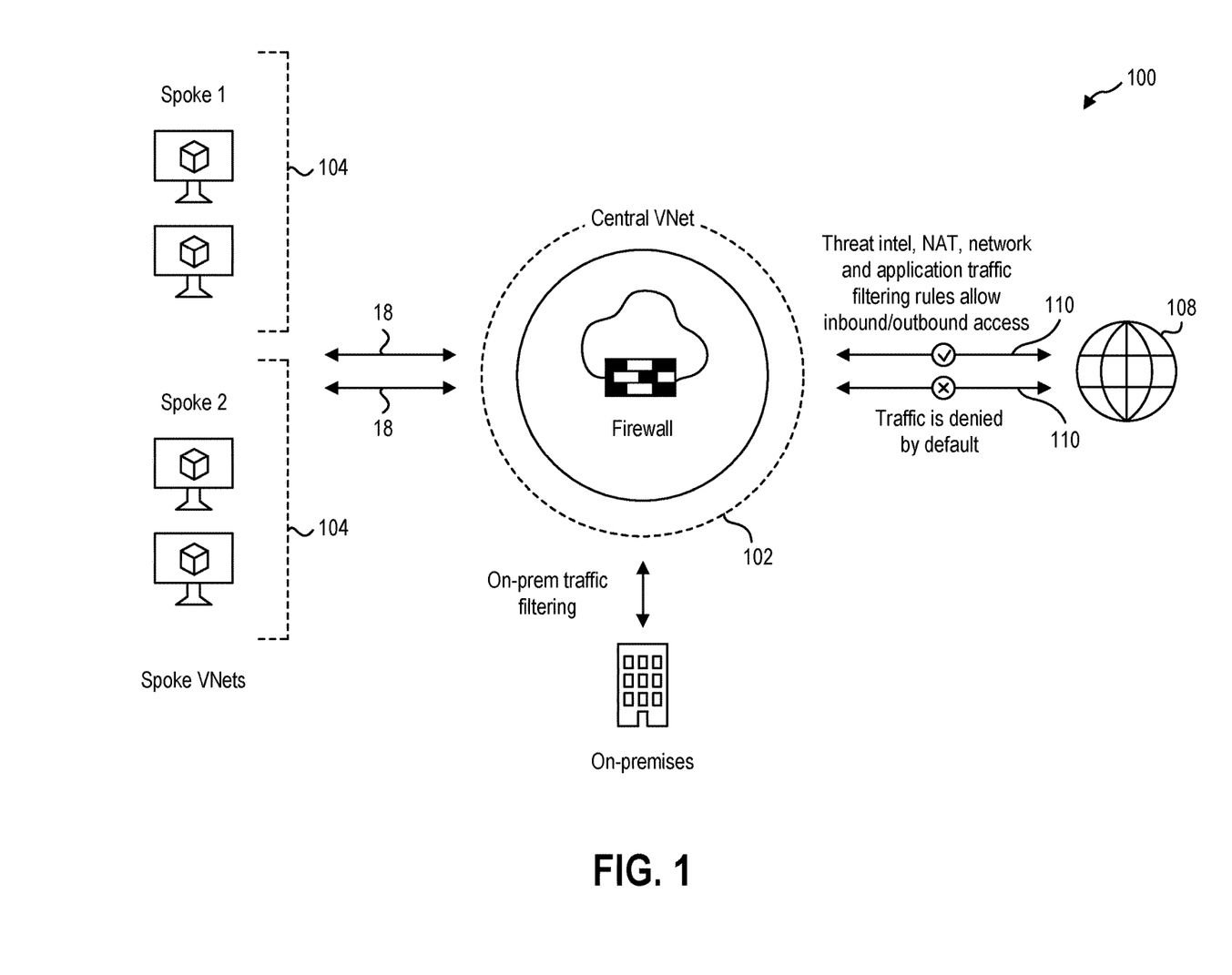
FIG. 1 illustrates an example network in accordance with implementations of the present disclosure.

Referring now to FIG. 1, illustrated is an example network 100 including a firewall 102 in communication with one or more spokes 104, 106 and the internet 108. The spokes 104, 106 may be endpoints in the network 100 where customers can deploy applications and/or where users may send web requests 18 to access a website on the internet 108.

The firewall 102 may receive a web request 18 from the users of network for accessing the internet 108. The web request 18 may include a FQDN 12 and/or a URL 14. The firewall 102 may perform processing to determine whether to allow or block the web traffic 110 associated with the web requests 18 (e.g., inbound and/or outbound access with the internet 108).

Figure 2:
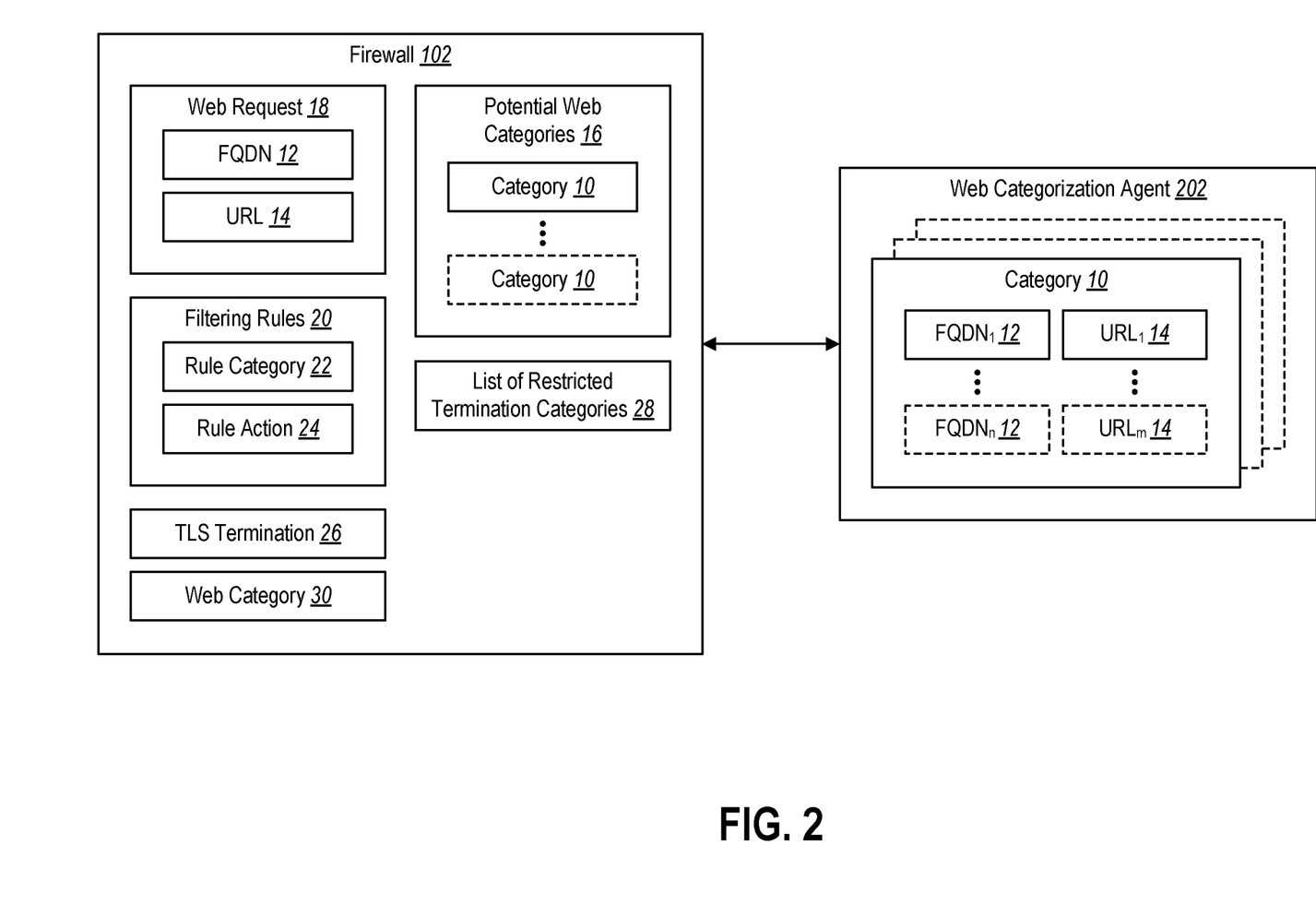
FIG. 2 illustrates an example firewall in accordance with implementations of the present disclosure.

Referring now to FIG. 2, illustrated is an example firewall 102 for use with the network 100 (FIG. 1). In an implementation, the firewall 102 may be a virtual machine. In another implementation, the firewall 102 may be a container. The firewall 102 may receive a web request 18 from a user of network 100 (FIG. 1) for accessing the internet 108 (FIG. 1). The web request 18 may include a FQDN 12 and/or a URL 14. The firewall 102 may perform processing to determine whether to allow or block the web traffic 110 (FIG. 1) associated with the web requests 18 (e.g., inbound and/or outbound access with the internet 108).

The firewall 102 may send a request to a web categorization agent 202 to classify the web request 18 using the FQDN 12. The firewall 102 may be in communication with a web categorization agent 202 remote from the firewall 102. The firewall 102 may send the FQDN 12 of the web request 18 to the web categorization agent 202. The web categorization agent 202 may include a plurality of web categories 10. Example web categories 10 may include, but are not limited to, social media, news, search engine, banking, gaming, gambling, weather, shopping, lifestyle, entertainment, leisure, streaming media, downloads, sports, finance, and/or travel. Each web category 10 may be associated with one or more FQDNs 12 (up to n, where n is an integer) and/or one or more URLs 14 (up to m, where m is an integer). For example, a category of "news" may be associated with the FQDN cnn.com. In addition, the category "news" may also be associated with the URL google.com/news. FQDNs 12 and/or URLs 14 may be associated with one or more different categories 10. One example FQDN 12 that returns multiple categories 10 is the FQDN youtube.com. The multiple categories 10 may include streaming media, downloads, and entertainment. Another example FQDN 12 that returns multiple categories 10 is the FQDN pintrest.com. The multiple categories 10 may include leisure, recreation, and social networking.

The firewall 102 receives one or more categories 10 (up to r, where r is an integer) from the web categorization agent 202 as potential web categories 16 that match the FQDN 12 of the web request 18. By receiving or more categories 10, the firewall 102 has more information available to use when making a traffic filtering decision for the web traffic 110.

If TLS termination 26 is enabled on the firewall 102, the firewall 102 may perform TLS termination 26 on the web request 18 to access the full URL 14 for the web request 18. A user of the firewall 102 (e.g., an administrator) and/or the system may enable TLS termination 26 for the firewall 102. The firewall 102 may use the URL 14 to classify the web request 18 for use when making a traffic filtering decision to allow or block the web traffic 110.

The firewall 102 may use the information provided from the web categorization agent 202 to determine whether to perform TLS termination 26 on the web request 18. The firewall 102 may use the potential web categories 16 received from the web categorization agent 202 to make a determination whether to proceed with TLS termination 26 on the web request 18.

The firewall 102 may use one or more filtering rules 20 in determining whether to allow or block the web traffic 110. The filtering rules 20 may include a plurality of rule categories 22 for blocking or allowing the web traffic 110. Thus, each filtering rule 20 may have one or more rule categories 22 (target categories) for blocking or allowing the web traffic 110.

In determining whether to proceed with TLS termination 26 on the web request 18, the firewall 102 may compare the potential web categories 16 received to the rule categories 22 of the one or more filtering rules 20. If a match occurs between any of the potential web categories 16 and any rule category 22 of the filtering rules 20, the firewall 102 may proceed with determining whether to perform TLS termination 26 on the web request 18.

The firewall 102 may also include a list of restricted termination categories 28 that includes a plurality of categories where TLS termination 26 should not be performed by the firewall 102. Certain web traffic 110 that is encrypted should not be decrypted using TLS termination 26 for different reasons, such as, but not limited to, privacy reasons and/or compliance policies. For example, the web traffic 110 may be related to personal information and/or protected information. The restricted termination categories 28 may include, but are not limited to, health information, finance information, government information, and/or education information. The list of restricted termination categories 28 may be created by hardcoding a plurality of categories where TLS termination 26 is prohibited based on privacy policies or compliance standards. In addition, the restricted termination categories 28 may be created by a user configuring the categories included based on organizational policy or compliance standards. As such, any web request 18 associated with a category included in the list of restricted termination categories 28 remains encrypted and should not be decrypted by the firewall 102.

The firewall 102 may compare the potential web categories 16 received from the web categorization agent 202 to the list of restricted termination categories 28. If a match occurs between any of the potential web categories 16 and any category included in the list of restricted termination categories 28, the firewall 102 may prevent TLS termination 26 from occurring on the web request 18. For example, the firewall 102 may prevent TLS termination 26 from occurring for privacy reasons and/or other compliance reasons. As such, the web request 18 remains encrypted and the firewall 102 may filter the web traffic 110 using the returned potential web categories 16 received from the web categorization agent 202 based on the FQDN 12 of the web request 18.

If a match does not occur between any of the potential web categories 16 and any category included in the list of restricted termination categories 28, the firewall 102 may perform TLS termination 26 on the web request 18. As such, the firewall 102 may perform TLS termination 26 on the web request 18 if any category of the potential web categories 16 matches any rule category 22 of the filtering rules 20 and the potential web categories 16 are not included in the list of restricted termination categories 28. The firewall 102 may open the packet by performing TLS termination 26 to decrypt the packet and extract the URL 14 for the web request 18. By performing TLS termination 26, the firewall 102 may have more information available for the web request 18 from the URL 14, and thus, the firewall 102 may use the additional information to provide a more accurate classification of the web request 18.

The firewall 102 may send the URL 14 to the web categorization agent 202 and may receive one or more web categories 30 for the URL 14 from the web categorization agent 202. In an implementation, the web categorization agent 202 may provide a single web category 30 for the URL 14. The firewall 102 may filter the web traffic 110 using the received web category 30 for the URL 14.

The firewall 102 may use one or more filtering rules 20 in determining whether to allow or block the web traffic 110. The filtering rules 20 may include policies for allowing or blocking the web traffic 110, such as, but not limited to, a plurality of rule categories 22 for blocking or allowing the web traffic 110. The polices may be user configured (e.g., organization specific). In addition, the policies may be based on known threats or malicious traffic.

The filtering rules 20 may include a rule action 24 for allowing or denying the web traffic. The rule action 24 may include allowing the web traffic 110 that matches the rule categories 22. For example, the firewall 102 may allow the web traffic 110 for the category "travel." In addition, the rule action 24 may include denying web traffic 110 that matches the rule categories 22. For example, the firewall may block or prevent the web traffic 110 for the category "games." As such, different filtering rules 20 may have different rule actions 24 that the firewall 102 takes to filter the web traffic 110.

If the firewall is unable to perform TLS termination 26, the firewall 102 may compare the received potential web categories 16 for the web request 18 to the rule categories 22 included in the filtering rules 20 to determine whether to allow the web request 18 or deny the web request 18. For example, if the filtering rules 20 indicate to allow the category "sports" and the potential web category 16 returned for espn.com is "sports," the firewall 102 may allow the web traffic 110 for espn.com.

However, if the firewall 102 was able to perform TLS termination 26, the firewall 102 may compare the web category 30 for the URL 14 for the web request 18 to the rule categories 22 included in the filtering rules 20 to determine whether to allow the web request 18 or deny the web request 18. By having the full URL 14 available, the firewall 102 may have more information to use in deciding whether to allow or block the web traffic 110. The full URL 14 may provide additional information for use by the firewall 102 than the FQDN 12.

Each of the components of the firewall 102 may be in communication with each other using any suitable communication technologies. In addition, while the components of the firewall 102 are shown to be separate, any of the components or subcomponents may be combined into fewer components, such as into a single component, or divided into more components as may serve a particular implementation. Moreover, the components of the firewall 102 may include hardware, software, or both. For example, the components of the firewall 102 may include one or more instructions stored on a computer-readable storage medium and executable by processors of one or more computing devices. When executed by the one or more processors, the computer-executable instructions of one or more computing devices can perform one or more methods described herein. Alternatively, the components of the firewall 102 may include hardware, such as a special purpose processing device to perform a certain function or group of functions. Additionally, or alternatively, the components of the firewall 102 may include a combination of computer-executable instructions and hardware.

As such, the firewall 102 may make an informed decision whether to terminate the web request 18 using TLS termination 26 with only a portion of the information available for making the decision to terminate. The two step process used by the firewall 102 may be used to improve security by only performing TLS termination on categories of web requests that may not violate privacy policies or other user configured policies for when TLS termination may not occur. In addition, the firewall 102 may improve the web categorization of web requests by performing a two-step process of classification of the web requests and using the classification of the URL 14 in deciding whether to allow or prevent the web traffic 110.

Figure 3:
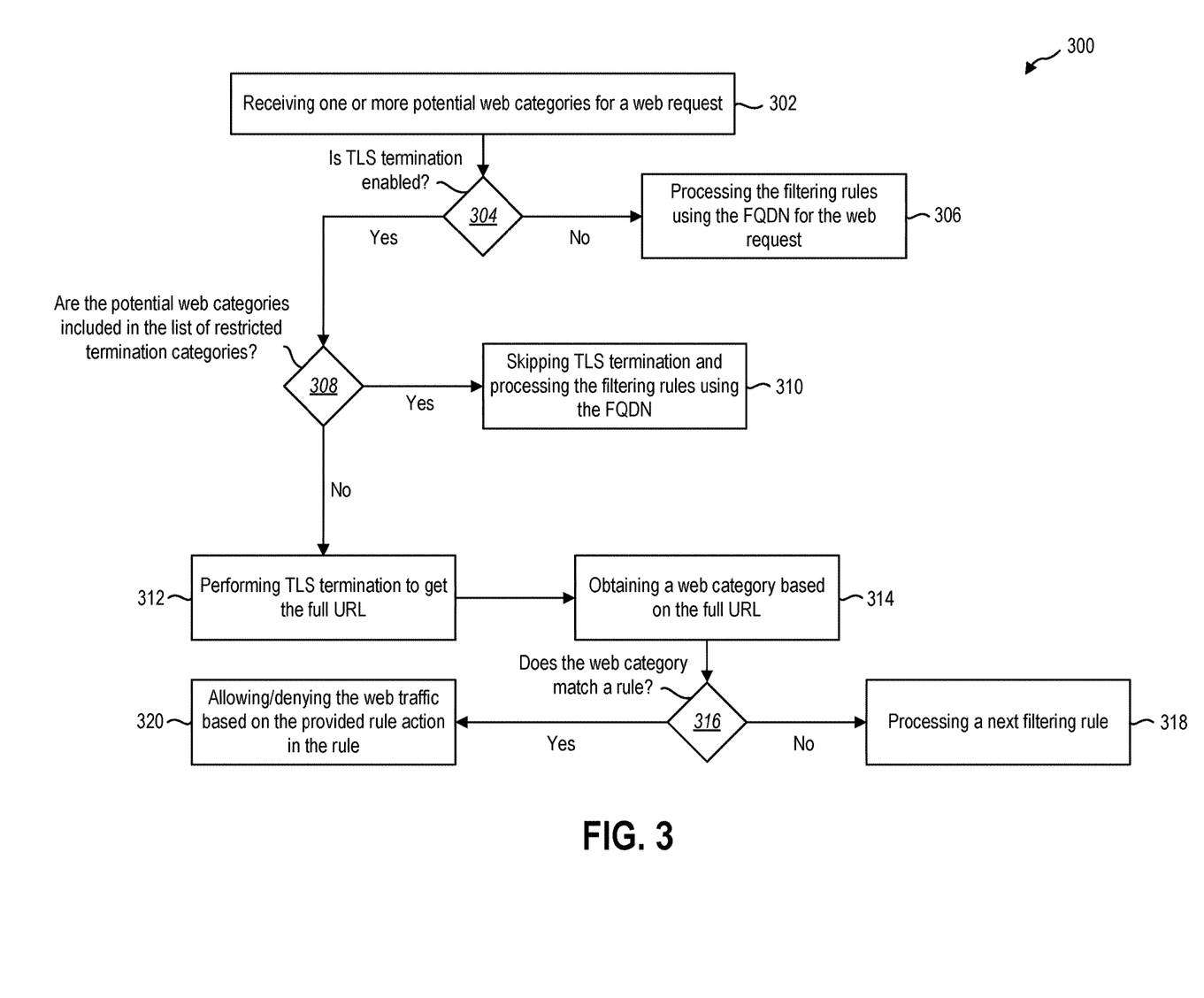
FIG. 3 illustrates an example method for web categorization in accordance with implementations of the present disclosure.

Referring now to FIG. 3, illustrated is an example method 300 preformed by the firewall 102 (FIG. 2) for determining whether to perform TLS termination 26 (FIG. 2) on web request 18 (FIG. 2) to provide a categorization of the web traffic 110 (FIG. 2). The actions of method 300 may be discussed below with reference to the architecture of FIGS. 1 and 2.

At 302, method 300 may include receiving one or more potential web categories for a current web request. The firewall 102 may receive a web request 18 to access the internet from a user of network 100. The web request 18 may include a FQDN 12. The firewall 102 may send a request to the web categorization agent 202 with the FQDN 12 for a categorization of the FQDN 12. The web categorization agent 202 may be remote from the firewall 102. The web categorization agent 202 may provide the firewall 102 one or more potential web categories 16 associated with the FQDN 12.

The web categorization agent 202 may provide the firewall 102 a single potential web category 16 for the current web request 18. One example may include the web categorization agent 202 returning "weather" as a potential web category 16 for weather.com. In addition, the web categorization agent 202 may provide a plurality of potential web categories 16 for the current web request 18. Another example may include the web categorization agent 202 returning "search engine", "news", "portal", and/or "maps" as potential web categories 16 for a web request 18 for google.com. The web categorization agent 202 may provide all potential web categories 16 associated with the FQDN 12 of the web request 18 and/or may provide a subset of the potential web categories 16 associated with the FQDN 12 of the web request 18. As such, the web categorization agent 202 may return one or more possible web categories for a web request 18.

At 304, method 300 may include determining whether TLS termination is enabled for this traffic filtering rule. TLS termination 26 is a process by which encrypted traffic is decrypted according to the TLS protocol specification. As a result, TLS termination 26 allows the firewall 102 to decrypt the encrypted traffic and see the full URL 14. TLS termination 26 may be enabled for any application level traffic filtering rule. TLS termination 26 may not be the default setting for the firewall 102. As such, the user may opt-in and/or enable TLS termination 26 and TLS termination 26 may not occur unless TLS termination 26 has been enabled by the system and/or a user. For example, a user may have enabled TLS termination 26 for web requests 18 relating to search engines. Another example may include a web request 18 for http, where TLS termination 26 is not enabled for the web request 18.

At 306, method 300 may include processing the filtering rules using the FQDN for the web request in response to TLS termination not being enabled. If TLS termination 26 is not enabled on the firewall 102, the firewall 102 may process the filtering rules 20 for allowing or blocking the web traffic 110 associated with the web request 18 using only the FQDN 12 of the web request 18. If the URL 14 is available, for example, for an http web request, the firewall 102 may process the filtering rules 20 for allowing or blocking the web traffic 110 using the URL 14. The firewall 102 may use the received potential web categories 16 for the FQDN 12 in making a decision whether to allow or block the web traffic 110. As such, if TLS termination 26 is not enabled for the traffic filtering rule, the firewall 102 may only use the available information associated with the web request 18 for processing the filtering rules 20 for allowing or blocking the web traffic 110.

At 308, method 300 may include verifying whether any of potential web categories are included in the list of restricted termination categories when TLS termination is enabled for the traffic filtering rule. The firewall 102 may perform a verification or check whether any category included in the list of potential web categories 16 is included in the list of restricted termination categories 28. For example, the firewall 102 may determine if a match occurs between the one or potential web categories with the list of restricted termination categories 28 by comparing the one or more potential web categories 16 with all of the categories included in the list of restricted termination categories 28.

At 310, method 300 may include skipping TLS termination and processing the filtering rules using the FQDN for the web request in response to determining that any of the potential web categories is included in the list of restricted termination categories. If the firewall 102 determines a match occurs between the one or more potential web categories 16 and any category included in the list of restricted termination categories 28, the firewall 102 will not perform TLS termination 26 on the web request 18. For example, if the one or more potential web categories 16 includes "sports", "news", and "health" and the list of restricted termination categories 28 includes "health", "finance", and "education", the firewall 102 may determine a match occurred between the category "health" included in the list of potential web categories 16 and the category "health" included in the list of restricted termination categories 28. When a match occurs, the firewall 102 may not decrypt the packet by performing TLS termination 26 and may process the filtering rules 20 using the FQDN 12 for the web request 18. As such, the firewall 102 may use the received potential web categories 16 for the FQDN 12 in making a decision whether to allow or block the web traffic 110.

At 312, method 300 may include performing the TLS termination to get the full URL in response to determining that any of the potential web categories are not included in the list of restricted termination categories. The firewall 102 may perform the TLS termination 26 on the web request 18 to access the full URL 14 of the web request 18 when a match does not occur between the one or more potential web categories 16 and any category included in the list of restricted termination categories 28. For example, if the one or more potential web categories 16 includes "sports", "news", and "travel" and the list of restricted termination categories 28 includes "health", "finance", and "education", the firewall 102 may determine that none of the potential web categories 16 are included in the list of restricted termination categories 28, and thus, it may be safe to perform the TLS termination 26 on the web request 18.

At 314, method 300 may include obtaining a web category based on the full URL. The firewall 102 may send the URL 14 to the web categorization agent 202 and the web categorization agent 202 may provide one or more web categories 30 for the URL 14. In an implementation, the firewall 102 may receive a single web category 30 for the URL 14 from the web categorization agent 202. For example, the URL 14 may be google.com/news and the web category 30 may be "news."

At 316, method 300 may include determining whether the web category matches a rule category of the filtering rules. The firewall 102 may compare the web category 30 received for the URL 14 to the rule categories 22 included in the filtering rules 20 for allowing or denying the web traffic 110.

At 320, method 300 may include allowing or denying the web traffic based on the provided rule action in the filtering rules. The filtering rules 20 may include a rule action 24 that allows the web traffic 110 that matches the rule categories 22. For example, the firewall 102 may allow the web traffic 110 for the category "travel." In addition, the filtering rules 20 may include a rule action 24 that denies web traffic 110 that matches the rule categories 22. For example, the firewall may block or prevent the web traffic 110 for the category "games." As such, different filtering rules 20 may have different rule actions 24 that the firewall 102 takes to filter the web traffic 110.

When a match occurs between the web category 30 and the rule category 22 for a filtering rule 20, the firewall 102 may perform the rule action 24 associated with the filtering rule 20 for the web category 30 (e.g., deny or allow the web traffic 110). By using the web category 30 for the full URL 14, a more accurate category for the web request 18 may be used by the firewall 102 in making a filtering decision whether to allow or deny the web traffic 110 for the web request 18.

At 318, method 300 may include processing the next filtering rule. When a match does not occur between the web category 30 and the rule category 22 for a filtering rule 20, the firewall 102 may compare another rule category 22 for another filtering rule 20 until a match occurs between the web category 30 and the rule category. Method 300 may return to 302 and start again.

As such, method 300 may be used to improve the web categorization of web requests 18 by performing a two-step process of classification of the web requests 18. The first classification provides possible web categories for the web requests using the FQDN of the web requests 18. In addition, the first classification may be used to determine whether TLS termination may be performed on the web requests 18. If one category of the possible web categories is a target rule category in a filtering rule for web traffic and the possible web categories are not included in the do not terminate list, TLS termination may be performed on the web requests 18. The second classification provides a web category for the full URL after performing TLS termination on the web requests 18. Method 300 may be used to improve security by only performing TLS termination on categories of web requests 18 that may not violate privacy policies or other user configured policies for when TLS termination may not occur. As such, method 300 may be used to improve the accuracy of filtering web traffic while maintaining the security of the web traffic.

Figure 4:
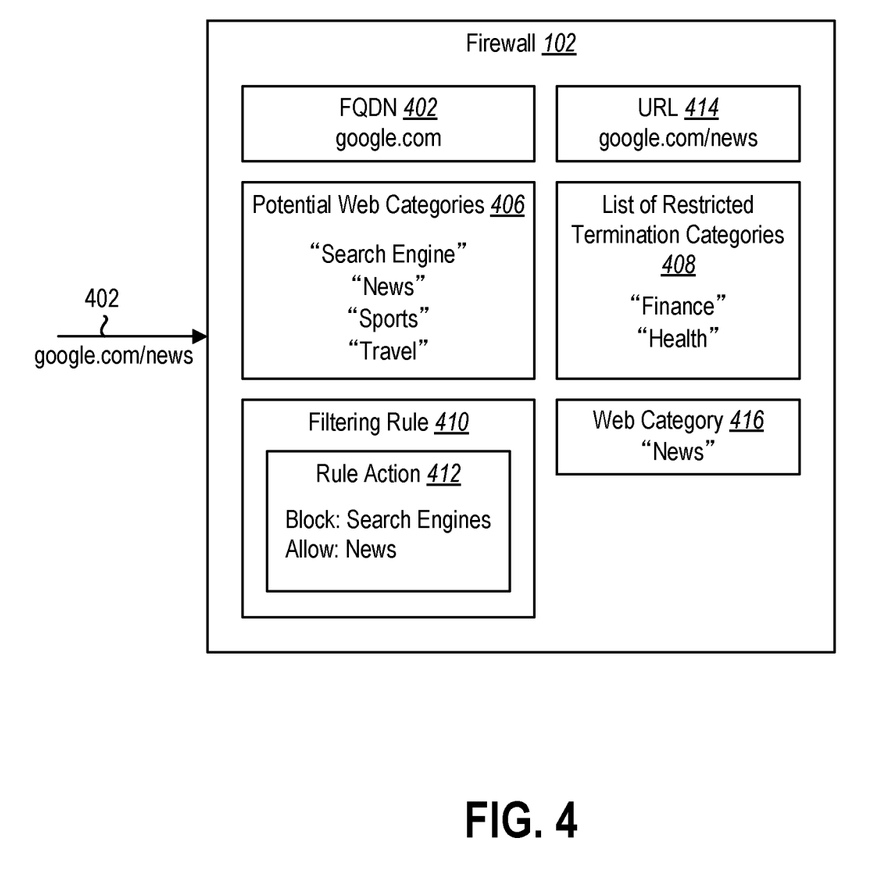
FIG. 4 illustrates an example firewall filtering web traffic in accordance with implementations of the present disclosure.

Referring now to FIG. 4, illustrated is an example use case of the firewall 102 filtering web traffic. The firewall 102 may receive a web request 402 for google.com/news. The firewall 102 may determine that the FQDN 404 for the web request is google.com. The firewall 102 may receive a list of potential web categories 406 for the FQDN 404 google.com from the web categorization agent 202 (FIG. 2). The list of potential web categories 406 may include the following categories "search engine", "news", "sports", "travel." The firewall 102 may determine whether TLS termination is enabled for the web request 402.

If TLS termination is not enabled for the web request 402, the firewall 102 may apply filtering rule 410 to the list of potential web categories 406 for the FQDN 404 google.com. The filtering rule 410 may have a rule action 412 to block "search engine" categories and allow "news" categories. The firewall 102 performs the rule action 412 of blocking the web request 402 in response identifying a match between the category "search engine" in the list of potential web categories 406 for the web request 402 and the category "search engine" in the rule action 412. As such, the firewall 102 blocks the web traffic for google.com since a match occurred with the rule action 412 to block search engines, even though the user was attempting to access google.com/news.

If TLS termination is enabled for the web request 402, the firewall 102 may compare the categories included in the list of potential web categories 406 to the categories included in the list of restricted termination categories 408 in determining whether to terminate the web request 402 and extract the URL 414 for the web request 402. The list of restricted termination categories 408 may include "finance" and "health." The firewall 102 may determine that none of the potential web categories 406 match the categories included in the list of restricted termination categories 408, and thus, the firewall 102 may proceed with terminating the web request 402. The firewall 102 may determine that the URL 414 is google.com/news for the web request 402.

The firewall 102 may send the URL 414 to the web categorization agent 202 and may receive a web category 416 of "news" for the URL 414. The firewall 102 may apply filtering rule 410 to the web category 416 for the URL 414, google.com/news. The filtering rule 410 may have a rule action 412 to block "search engine" categories and allow "news" categories. The firewall 102 performs the rule action 412 of allowing the web request 402 in response identifying a match between the web category "news" for the URL 414 and the category "news" in the rule action 412. Thus, when TLS termination is enabled, the firewall 102 is able to allow access to google.com/news using the classification for the URL 414 instead of using the potential classifications for the FQDN 12. By performing TLS termination on the web request 402, the firewall 102 is able to more accurately classify the web request 402 and allow the web request 402.

Figure 5:
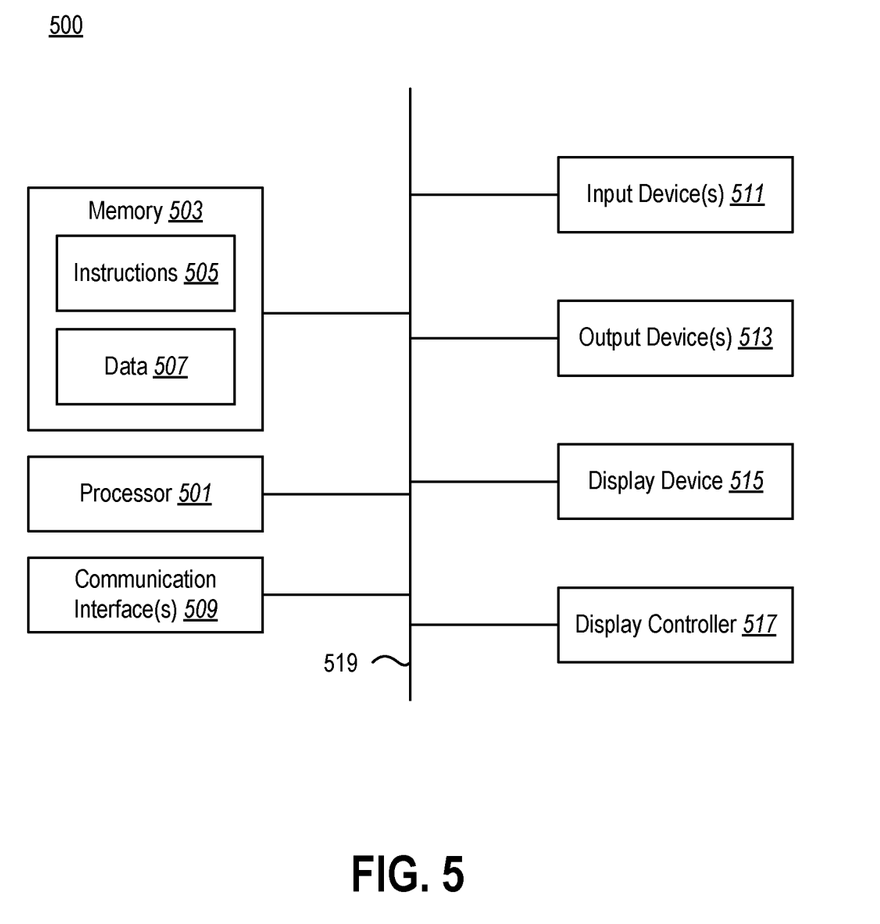
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, embodiments of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method performed by a firewall, comprising:
   receiving a plurality of potential web categories for a web request based on a fully qualified domain name (FQDN) for the web request without receiving a full uniform resource locator (URL) for the web request;

comparing, in response to Transport Layer Security (TLS) termination being enabled for the web request, the plurality of potential web categories to a list of restricted termination categories;

comparing the plurality of potential web categories to filtering rule categories defined by at least one filtering rule to allow or block web requests;

performing the TLS termination on the web request in response to the plurality of potential web categories not matching any category of the list of restricted termination categories and a match occurring between one or more of the plurality of potential web categories and any filtering rule categories; and skipping the TLS termination on the web request in response to a match occurring between one or more of the plurality of potential web categories and any category of the list of restricted termination categories or a match not occurring between the plurality of potential web categories and any filtering rule categories.

2. The method of claim 1, further comprising:
obtaining the URL for the web request in response to performing the TLS termination;
receiving a web category for the URL of the web request; and
filtering web traffic associated with the web request using the web category for the web request.

3. The method of claim 2, wherein filtering the web traffic further includes:
applying the at least one filtering rule that includes a rule action for the filtering rule categories, wherein the rule action includes allowing the web traffic or denying the web traffic; and
performing the rule action when a match occurs between the web category and any filtering rule categories.

4. The method of claim 2, wherein the URL is different from the FQDN.

5. The method of claim 1, further comprising:
applying the at least one filtering rule to the plurality of potential web categories for the FQDN in response to the TLS termination not being enabled for the web request, wherein the at least one filtering rule includes a rule action for allowing web traffic for the filtering rule categories or denying the web traffic for the filtering rule categories; and
performing the rule action when a match occurs between the plurality of potential web categories and any of the filtering rule categories.

6. The method of claim 1, further comprising:
applying the at least one filtering rule to the plurality of potential web categories for the FQDN in response to skipping the TLS termination, wherein the at least one filtering rule includes a rule action for allowing web traffic for the filtering rule categories or denying the web traffic for the filtering rule categories; and
performing the rule action when a match occurs between the plurality of potential web categories and any of the filtering rule categories.

7. The method of claim 1, wherein the list of restricted termination categories is created based on one or more of privacy policies, compliance standards, or user configured policies.

8. The method of claim 1, wherein a firewall performs the TLS termination.

9. The method of claim 8, wherein the firewall receives the plurality of potential web categories from a categorization agent remote from the firewall.

10. A firewall, comprising:
one or more processors; memory in electronic communication with the one or more processors; and
instructions stored in the memory, the instructions being executable by the one or more processors to:
receive a plurality of potential web categories for a web request based on a fully qualified domain name (FQDN) for the web request without receiving a full uniform resource locator (URL) for the web request;
compare, in response to Transport Layer Security (TLS) TLS termination being enabled on the firewall for the web request, the plurality of potential web categories to a list of restricted termination categories;
compare the plurality of potential web categories to filtering rule categories defined by at least one filtering rule of the firewall to allow or block web requests;
perform the TLS termination on the web request in response to the plurality of potential web categories not matching any category of the list of restricted termination categories and a match occurring between one or more of the plurality of potential web categories and any filtering rule categories; and
skip the TLS termination on the web request in response to a match occurring between one or more of the plurality of potential web categories and any category of the list of restricted termination categories or a match not occurring between the plurality of potential web categories and any filtering rule categories.

11. The firewall of claim 10, wherein the instructions are further executable by the one or more processors to:
obtain the URL for the web request in response to performing the TLS termination;
receive a web category for the URL of the web request; and
filter web traffic associated with the web request using the web category for the web request.

12. The firewall of claim 11, wherein the instructions are further executable by the one or more processors to filter the web traffic by:
applying the at least one filtering rule that includes a rule action for the filtering rule categories, wherein the rule action includes allowing the web traffic or denying the web traffic; and
performing the rule action when a match occurs between the web category and any filtering rule categories.

13. The firewall of claim 11, wherein the URL is different from the FQDN.

14. The firewall of claim 10, wherein the instructions are further executable by the one or more processors to:
apply the at least one filtering rule to the plurality of potential web categories for the FQDN in response to the TLS termination not being enabled for the web request, wherein the at least one filtering rule includes a rule action for allowing web traffic for the filtering rule categories or denying the web traffic for the filtering rule categories; and
perform the rule action when a match occurs between the plurality of potential web categories and any rule category of the rule categories.

15. The firewall of claim 14, wherein the instructions are further executable by the one or more processors to:
apply the at least one filtering rule to the plurality of potential web categories for the FQDN in response to skipping the TLS termination, wherein the at least one filtering rule includes a rule action for allowing web traffic for the filtering rule categories or denying the web traffic for the filtering rule categories; and perform the rule action when a match occurs between the plurality of potential web categories and any of the filtering rule categories.

16. The firewall of claim 10, wherein the list of restricted termination categories is created based on privacy policies or compliance standards.

17. The firewall of claim 10, wherein the list of restricted termination categories is created based on user configured policies.

18. The firewall of claim 10, wherein the firewall is a virtual machine.

19. The firewall of claim 10, wherein the firewall receives the plurality of potential web categories from a categorization agent remote from the firewall.

20. A device, comprising:
one or more processors; memory in electronic communication with the one or more processors; and
instructions stored in the memory, the instructions being executable by the one or more processors to:
receive a plurality of potential web categories for a web request based on a fully qualified domain name (FQDN) for the web request without receiving a full uniform resource locator (URL) for the web request;
compare, in response to Transport Layer Security (TLS) TLS termination being enabled for the web request, the plurality of potential web categories to a list of restricted termination categories;
compare the plurality of potential web categories to filtering rule categories defined by at least one filtering rule to allow or block web requests;
perform the TLS termination on the web request in response to the plurality of potential web categories not matching any category of the list of restricted termination categories and a match occurring between one or more of the plurality of potential web categories and any filtering rule categories; and
skip the TLS termination on the web request in response to a match occurring between one or more of the plurality of potential web categories and any category of the list of restricted termination categories or a match not occurring between the plurality of potential web categories and any filtering rule categories.

* * * * *